S. N. WATE, Jr.
Pitman-Rods.
No. 143,648.     Patented Oct. 14, 1873.
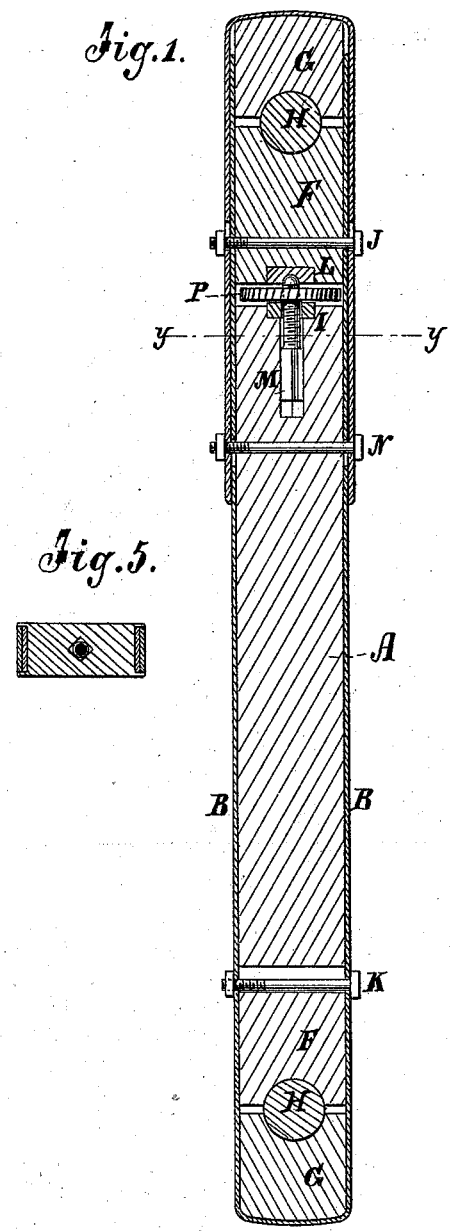
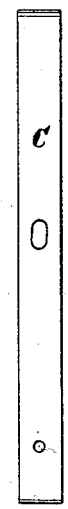
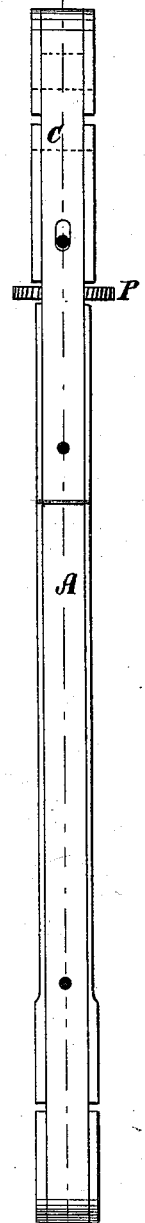
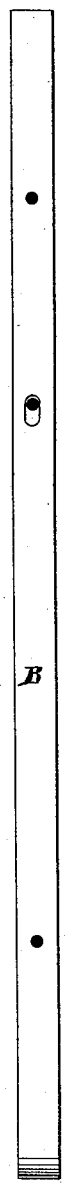
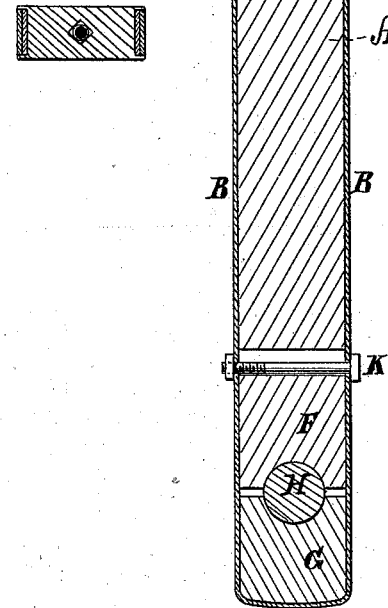
Witnesses:     Inventor:

UNITED STATES PATENT OFFICE.

SAMUEL N. WATE, JR., OF DANVILLE, PENNSYLVANIA, ASSIGNOR TO HIMSELF AND PETER J. ADAMS, OF SAME PLACE.

IMPROVEMENT IN PITMAN-RODS.

Specification forming part of Letters Patent No. 143,648, dated October 14, 1873; application filed September 6, 1873.

*To all whom it may concern:*

Be it known that I, SAMUEL N. WATE, Jr., of Danville, in the county of Montour and State of Pennsylvania, have invented a new and useful Improvement in Adjustable Pitman-Rods, of which the following is a specification:

The invention consists in improving the pitman-rod connection for which I received Letters Patent November 19, 1872, as hereinafter described and pointed out in the claim.

Figure 1 is a longitudinal section taken on the line $x$ $x$ of Fig. 2, showing the side of the adjustable pitman. Fig. 2 is an edge view of the same. Fig. 3 is a view of the long strap, showing the round holes, and also the elongated or slotted hole, therein. Fig. 4 is a view of the short strap, also showing its round holes and its slotted hole. Fig. 5 is a cross-section of Fig. 1 taken on the line $y$ $y$.

Similar letters of reference indicate corresponding parts.

A is the main body of the rod. B is the long strap. C is the short strap. The former nearly surrounds the rod, and the latter laps onto it and incloses its ends, as seen in Fig. 1. J and N are bolts, which pass through the slotted holes in the two straps B and C. F F represent the inner, and G G the outer, brasses, which form bearings for the wrist-pins H H. M is a screw, to which is attached a milled nut, P. The forward end of this screw rests against the block L, which is inserted in the inner end of the brass F, as shown in Fig. 1. The body of the screw passes through the washer I, and its other end is inserted in the rod A, as seen. This end of the screw is flat or square, to prevent the screw from turning when the nut P is screwed down against the rod A. The bolts N and J fit tight in the rod A and brass F, and are moved with the rod A and brass F as they are pushed outward; but the hole through the long strap B for the bolt J, and the hole for the bolt N in the short strap C, are slotted, so that when the screw M and nut P push out the rod A, block L, and brass F, the bolt N draws in the long strap B, and the bolt J draws in the short strap C just as much as the screw M and nut P push the rod A and blocks L and F apart, so that all the wear and lost motion is taken up without changing the length of the rod. The nut P may be made of any form or shape, as occasion may require, and one or more nuts may be used on the same screw when the rod is required for heavy work. The bolt K in the other end of the rod A is to secure the long strap B to the rod A. One or more of these bolts may be used. The positions of the screw M and nut P are plainly shown in the drawing.

I have taken out the two cross-bars described in my former patent, and substituted the two bolts N and J. These bolts are not so close to the part of the rod where the screw and nut are inserted in the rod, and the straps are much stronger at that place, there being no holes to weaken the same where strength is required. The nut turning instead of screw is much more easy to adjust, and the rod does not need to be cut away to turn the screw. These two bolts N and J pass closely through the body of rod, and are carried outward by the screw and nut, thus drawing up the same on outside of each pin, while the screw and nut tighten up against inside of pins.

Having thus described my invention, I claim as new and desire to secure by Letters Patent—

The rotary nut P, stationary screw M, and blocks I, combined with the straps B C, bolts N J, rod A, and brass F, as and for the purpose described.

SAMUEL N. WATE, JR.

Witnesses:
E. W. CONKLING,
I. W. AMMON.